(12) United States Patent
Yoshida et al.

(10) Patent No.: US 10,702,848 B2
(45) Date of Patent: Jul. 7, 2020

(54) REACTOR INCLUDING END PLATE INCLUDING END PLATE FORMED OF A PLURALITY OF END PLATE PARTS

(71) Applicant: FANUC CORPORATION, Yamanashi (JP)

(72) Inventors: Tomokazu Yoshida, Yamanashi (JP);
Masatomo Shirouzu, Yamanashi (JP);
Kenichi Tsukada, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/957,327

(22) Filed: Apr. 19, 2018

(65) Prior Publication Data

US 2018/0311640 A1 Nov. 1, 2018

(30) Foreign Application Priority Data

Apr. 27, 2017 (JP) ................. 2017-088318

(51) Int. Cl.

| B01J 19/24 | (2006.01) |
|---|---|
| B01J 19/08 | (2006.01) |
| H01F 27/26 | (2006.01) |
| H01F 37/00 | (2006.01) |
| H01F 3/14 | (2006.01) |

(52) U.S. Cl.
CPC ............ *B01J 19/24* (2013.01); *B01J 19/087* (2013.01); *H01F 3/14* (2013.01); *H01F 27/263* (2013.01); *H01F 27/266* (2013.01); *H01F 37/00* (2013.01); *B01J 2219/085* (2013.01); *B01J 2219/24* (2013.01)

(58) Field of Classification Search
CPC .... B01J 19/087; B01J 19/24; B01J 2219/085; B01J 2219/24; H02K 1/148; H02K 1/18; H02K 1/28
USPC .......... 310/216.061, 260, 216.008–216.009, 310/411–413
See application file for complete search history.

(56) References Cited

U.S. PATENT DOCUMENTS

| 2,406,704 A * | 8/1946 | Mossay .................. H01F 30/12 307/156 |
|---|---|---|
| 4,912,618 A | 3/1990 | Krinickas, Jr. |
| 6,396,188 B1 * | 5/2002 | Kliman ................... H02K 3/20 310/261.1 |
| 2006/0087393 A1 | 4/2006 | Dahlgren et al. |
| | (Continued) | |

FOREIGN PATENT DOCUMENTS

| CN | 102082021 A | 6/2011 |
|---|---|---|
| CN | 205542311 U | 8/2016 |
| | (Continued) | |

*Primary Examiner* — Bernard Rojas
(74) *Attorney, Agent, or Firm* — RatnerPrestia (57) ABSTRACT

A reactor includes a core body having an outer peripheral iron core. A least three iron cores are in contact with or connected to an inner surface of the outer peripheral iron core, and coils are wound onto the at least three iron cores. Gaps are formed between two adjacent iron cores from among the at least three iron cores or between the at least three iron cores and a central iron core disposed at the center of the core body, through which gaps the iron cores are magnetically connectable. The reactor also includes an end plate fastened to at least one end of the core body such that the end plate is shaped to correspond to the outer peripheral iron core. The end plate is formed from a plurality of end plate parts.

4 Claims, 7 Drawing Sheets

(56) References Cited

U.S. PATENT DOCUMENTS

| | | | |
|---|---|---|---|
| 2006/0279148 A1* | 12/2006 | Baumgartner | H02K 5/1672 310/90 |
| 2009/0261939 A1* | 10/2009 | Shudarek | H01F 3/10 336/212 |
| 2016/0125998 A1* | 5/2016 | Bhide | H01F 37/00 336/5 |
| 2017/0040099 A1* | 2/2017 | Bhide | H01F 27/245 |
| 2017/0084377 A1 | 3/2017 | Maeda et al. | |
| 2018/0068783 A1* | 3/2018 | Maeda | H01F 27/24 |
| 2018/0261374 A1* | 9/2018 | Tsukada | H01F 27/085 |

FOREIGN PATENT DOCUMENTS

| | | |
|---|---|---|
| CN | 206098129 U | 4/2017 |
| DE | 102016010901 A1 | 3/2017 |
| JP | S58127627 U | 8/1983 |
| JP | H03502279 A | 5/1991 |
| JP | 2000-077242 A | 3/2000 |
| JP | 2001257121 A | 9/2001 |
| JP | 2008-210998 A | 9/2008 |
| WO | 2010119324 A2 | 10/2010 |

* cited by examiner

REACTOR INCLUDING END PLATE INCLUDING END PLATE FORMED OF A PLURALITY OF END PLATE PARTS

CROSS-REFERENCE TO RELATED APPLICATION

This application is a new U.S. Patent Application that claims benefit of Japanese Patent Application No. 2017-088318, filed Apr. 27, 2017, the disclosure of this application is being incorporated herein by reference in its entirety for all purposes.

BACKGROUND OF THE INVENTION

1. Field of the Invention

The present invention relates to a reactor having an end plate fastened to a core body.

2. Description of Related Art

Core bodies of reactors include a plurality of iron cores having coils wrapped therearound. Predetermined gaps are formed between the plurality of iron cores. Refer to, for example, Japanese Unexamined Patent Publication (Kokai) No. 2000-77242 and Japanese Unexamined Patent Publication (Kokai) No. 2008-210998. Furthermore, in order to form a core body, it is necessary to connect the plurality of iron cores to each other.

However, since it is necessary to maintain predetermined gaps, it is difficult to directly connect the plurality of iron cores. Thus, when forming a reactor, the plurality of iron cores of the core body are connected to each other using a connecting member, maintaining the predetermined gaps therebetween.

SUMMARY OF THE INVENTION

Coils are configured by winding a conductive wire material, and both ends of the conductive wire material protrude from the coil as extensions (leads). When forming a reactor, each of the extensions is bent to have a desired orientation and a desired shape. If the extensions are bent before the connecting member is attached to the core body, in some cases, the connecting member may be impeded by the extensions such that the connecting member cannot be attached to the core body. In other words, in the prior art, it is necessary to bend the extensions after the connecting member is attached to the core body. Thus, there is a problem in that the assembly process is restricted, reducing assembly efficiency.

Thus, the provision of a reactor for which the assembly process is not restricted is desired.

The first aspect of the present disclosure provides a reactor including a core body and an end plate fastened to at least one end of the core body, in which the end plate is formed from a plurality of end plate parts.

In the first aspect, since the end plate is formed from a plurality of end plate parts, the plurality of end plate parts can be attached to the core body even after the coil extensions have been bent. In other words, it is not necessary to attach the end plate to the core body before bending the extensions of the coils, and the assembly process is not restricted. Therefore, it is possible to prevent a reduction in assembly efficiency.

The object, features, and advantages of the present invention, as well as other objects, features and advantages, will be further clarified by the detailed description of the representative embodiments of the present invention shown in the accompanying drawings.

DETAILED DESCRIPTION

The embodiments of the present disclosure will be described below with reference to the accompanying drawings. In the following drawings, the same components are given the same reference numerals. For ease of understanding, the scales of the drawings have been appropriately modified.

In the following description, a three-phase reactor will be described as an example. However, the present disclosure is not limited in application to a three-phase reactor, but can be broadly applied to any multiphase reactor requiring constant inductance in each phase. Further, the reactor according to the present disclosure is not limited to those provided on the primary side or secondary side of the inverters of industrial robots or machine tools, but can be applied to various machines.

Figure 1:
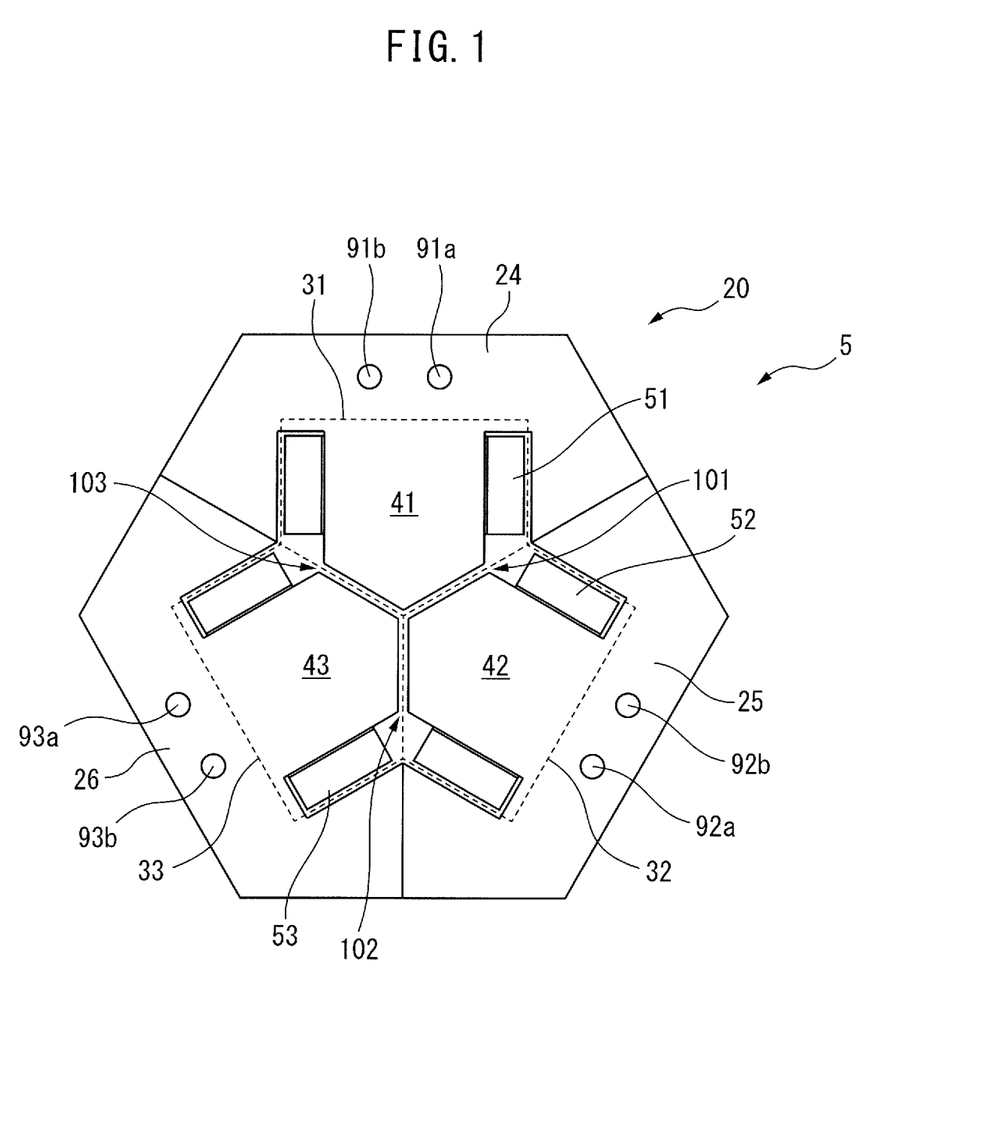
FIG. 1 is a first cross-sectional view of a core body.

FIG. 1 is a first cross-sectional view of a core body. As shown in FIG. 1, the core body 5 includes an outer peripheral iron core 20 and three iron core coils 31 to 33 which are magnetically connected to the outer peripheral iron core 20. In FIG. 1, the iron core coils 31 to 33 are disposed inside the substantially hexagonal outer peripheral iron core 20. These iron core coils 31 to 33 are arranged at equal intervals in the circumferential direction of the core body 5.

Note that the outer peripheral iron core 20 may have another rotationally symmetrical shape, such as a circular shape. In such a case, the end plate 81, which is described later, has a shape corresponding to that of the outer peripheral iron core 20. Furthermore, the number of iron core coils may be a multiple of three.

As can be understood from the drawings, the iron core coils 31 to 33 include iron cores 41 to 43, which extend in the radial directions of the outer peripheral iron core 20, and coils 51 to 53, which are wound onto the iron cores, respectively. The radially outer ends of the iron cores 41 to 43 are each in contact with the outer peripheral iron core 20, or are integrally formed with the outer peripheral iron core 20. The outer peripheral iron core 20 and the iron cores 41 to 43 are formed by stacking a plurality of iron plates, carbon steel plates, or electromagnetic steel sheets, or are formed from a powdered iron core.

Further, the radially inner ends of the iron cores 41 to 43 are each located near the center of the outer peripheral iron core 20. In the drawings, the radially inner ends of the iron cores 41 to 43 converge toward the center of the outer peripheral iron core 20, and the tip angles thereof are approximately 120 degrees. The radially inner ends of the iron cores 41 to 43 are separated from each other via gaps 101 to 103, through which magnetic connection can be established.

In other words, the radially inner end of the iron core 41 is separated from the radially inner ends of the two adjacent iron cores 42 and 43 via gaps 101 and 103. The same is true for the other iron cores 42 and 43. Note that, the sizes of the gaps 101 to 103 are equal to each other.

In the configuration shown in FIG. 1, since a central iron core disposed at the center of the core body 5 is not needed, the core body 5 can be constructed lightly and simply. Further, since the three iron core coils 31 to 33 are surrounded by the outer peripheral iron core 20, the magnetic fields generated by the coils 51 to 53 do not leak to the outside of the outer peripheral core 20. Furthermore, since the gaps 101 to 103 can be provided at any thickness at a low cost, the configuration shown in FIG. 1 is advantageous in terms of design, as compared to conventionally configured reactors.

Further, in the core body 5 of the present disclosure, the difference in the magnetic path lengths is reduced between the phases, as compared to conventionally configured reactors. Thus, in the present disclosure, the imbalance in inductance due to a difference in magnetic path length can be reduced.

Figure 2:
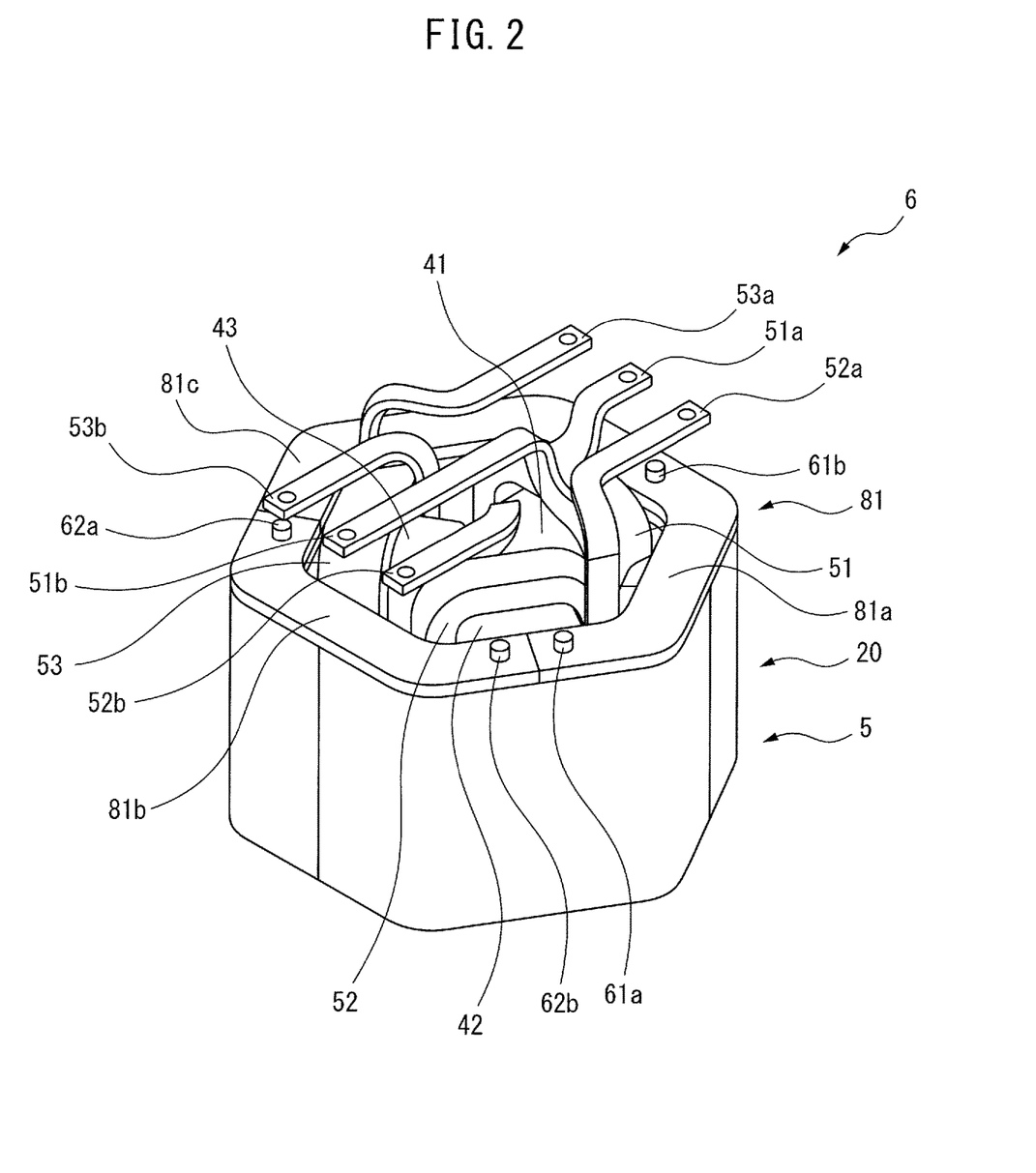
FIG. 2 is a perspective view of a reactor according to the first embodiment.

FIG. 2 is a perspective view of a reactor according to the first embodiment. The reactor 6 shown in FIG. 2 includes a core body 5 and an annular end plate 81 fastened to one end surface of the core body 5 in the axial direction. Note that a similar end plate may be fastened to the other end surface of the core body 5. The end plate 81 functions as a connecting member connected to the outer peripheral iron core 20 of the core body 5 (described later) over the entire edge of the outer peripheral iron core 20. The end plate 81 is preferably formed from a non-magnetic material, such as aluminum, SUS, a resin, or the like.

Further, extensions (leads) 51a and 51b extend from the coil 51 and are each bent to have a desired orientation and a desired shape. Each of the extensions 52a, 52b, 53a, and 53b extending from the coils 52 and 53 is also bent to a have desired orientation and a desired shape. By bending the extensions 51a to 53b as shown, the tips of the extensions 51a to 53b may be positioned radially outward of the inner peripheral surface of the outer peripheral iron core 20.

Figure 3:
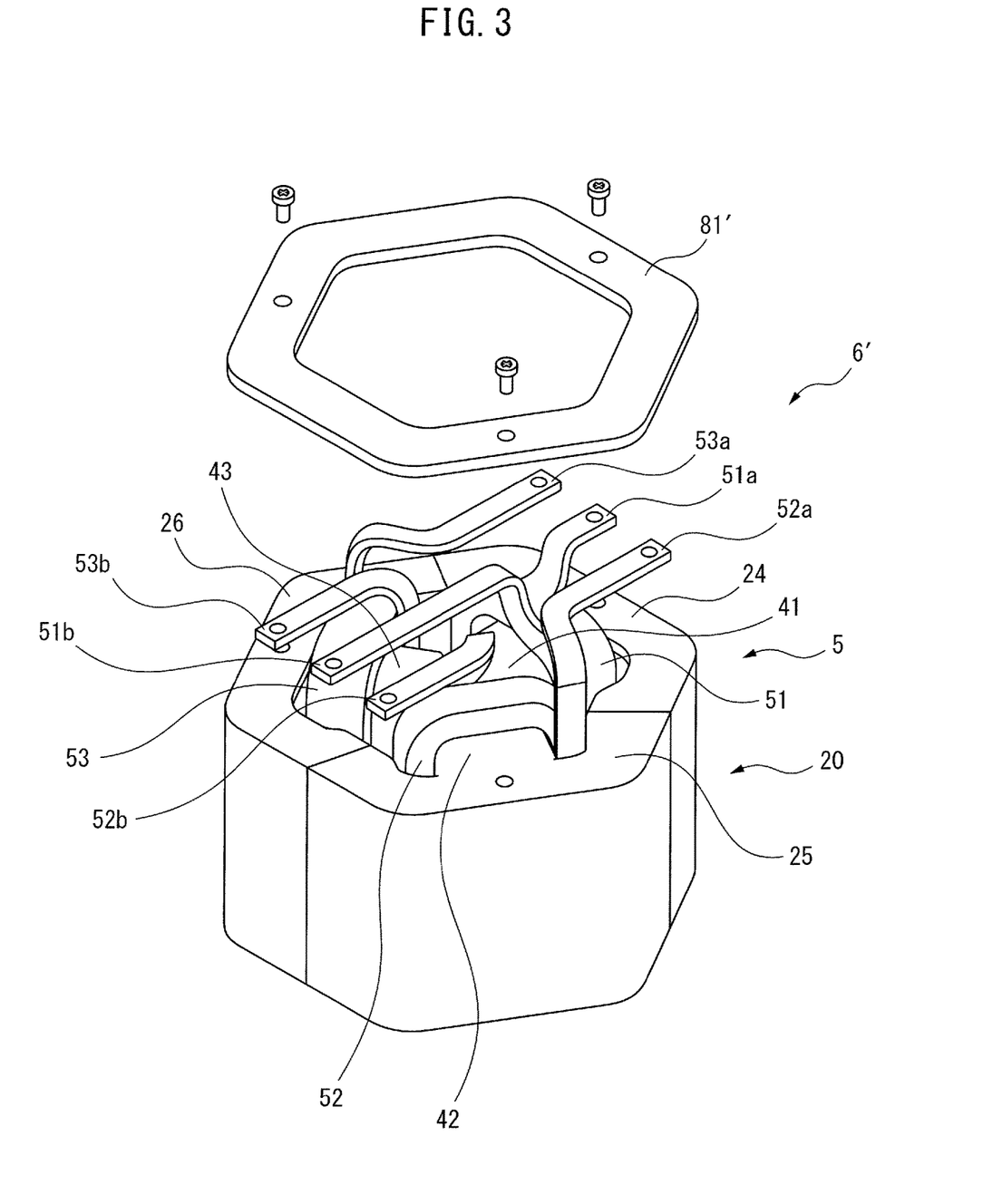
FIG. 3 is an exploded perspective view of another reactor.

FIG. 3 is an exploded perspective view of another reactor 6'. The coils 51 to 53 of the core body 5 shown in FIG. 3 also include extensions 51a to 53b, which are bent in the same fashion as the first embodiment. After the extensions 51a to 53b are bent in such a fashion, the annular end plate 81' is brought near to the end surface of the outer peripheral iron core 20. The dimensions of the end plate 81' shown in FIG. 3 are approximately equal to the dimensions of the end plate 81 of the first embodiment. In this case, since the end plate 81' is impeded by the tips of the extensions 51a to 53b, the end plate 81' cannot be attached to the outer surface of the outer peripheral iron core 20.

Note that, when the tips of the extensions 51a to 53b are positioned more radially inwardly than the inner surface of the outer peripheral iron core 20, the end plate 81' is not impeded by the tips of the extensions 51a to 53b. Thus, the end plate 81' can be arranged on the end surface of the outer peripheral iron core 20. However, in such a case, there is a risk that the operator's hand comes into contact with the tips of the extensions 51a to 53b, causing the operator to become injured, or causing the extensions 51a to 53b to become bent in an orientation different from the desired orientation. Thus, workability in the case of attaching the end plate 81' after the extensions 51a to 53b have already been bent is considerably low.

In other words, in the configuration shown in FIG. 3, it is necessary to bend the extensions 51a to 53b after attaching the end plate 81', as the connecting member, to the core body 5. Therefore, in the configuration shown in FIG. 3, there is a problem in that since the assembly process is restricted, assembly efficiency is reduced.

Figure 4:
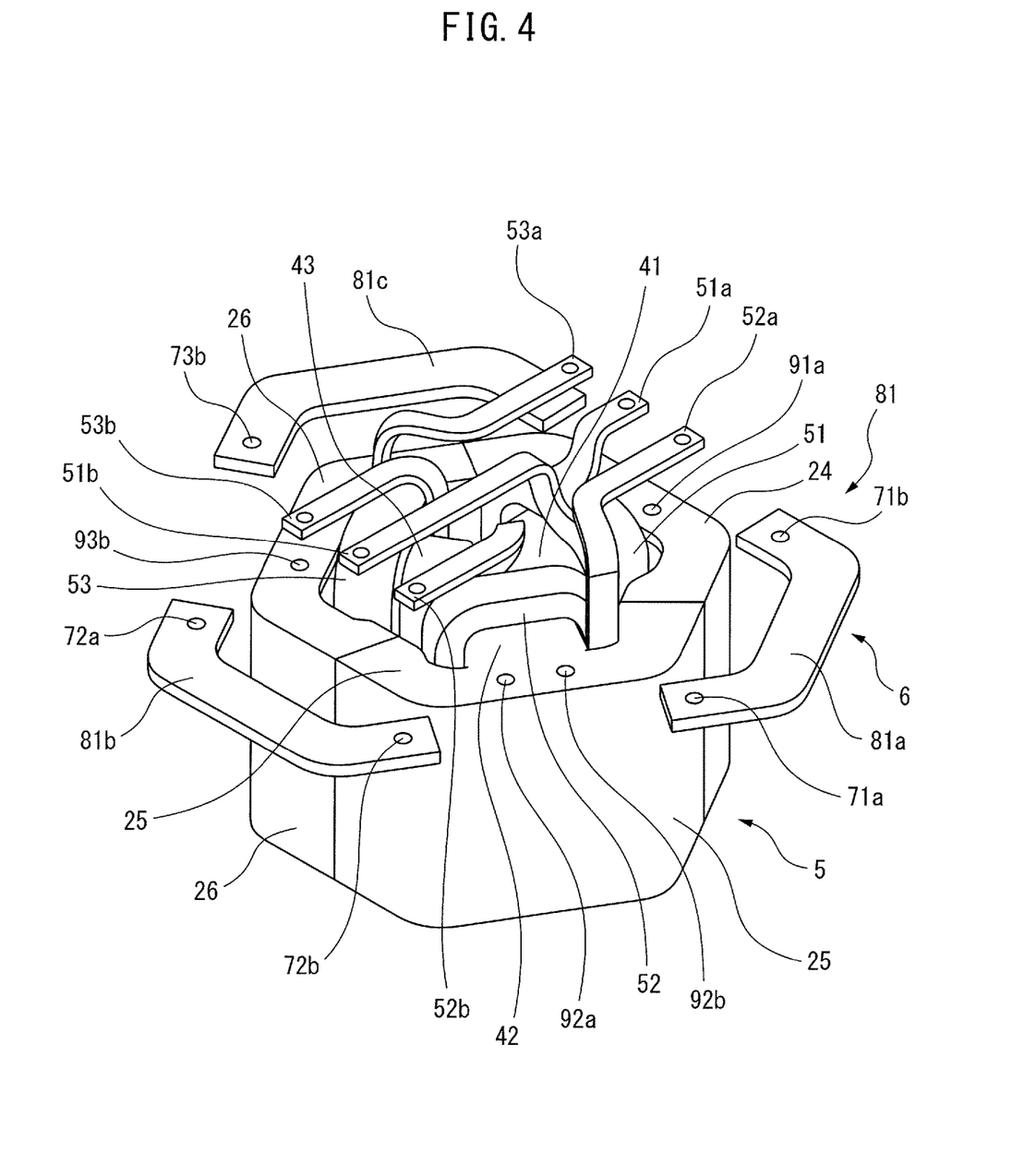
FIG. 4 is an exploded perspective view of the reactor shown in FIG. 2.

In connection thereto, FIG. 4 is an exploded perspective view of the reactor shown in FIG. 2. In FIG. 4, the end plate 81 is composed of three end plate parts 81a to 81c. These end plate parts 81a to 81c are formed by dividing the end plate 81 at equal intervals in the circumferential direction. Note that the end plate 81 may be formed from two end plate parts, or from four or more end plate parts. In this case, the end plate parts 81a to 81c are inserted into the regions between the bent extensions 51a to 53b and the end surface of the outer peripheral iron core 20 and are placed onto the end surface of the outer peripheral iron core 20 to form the end plate 81.

Referring once more to FIG. 1, holes 91a, 91b, 92a, 92b, 93a, and 93b are formed in the outer peripheral iron core 20 at positions corresponding to the iron cores 41 to 43. Further, similar holes 71a, 71b, 72a, 72b, 73a, and 73b are formed in both end sections of the end plate parts 81a to 81c, as shown in FIGS. 3 and 4.

After the end plate parts 81a to 81c are placed onto the end surface of the outer peripheral iron core 20, fasteners, such as screws 61a, 61b, 62a, 62b, 63a, and 63b (shown only in FIG. 2), are inserted through the holes 71a to 73b of the end plate parts 81a to 81c and are threaded into the holes 91a to 93b of the outer peripheral iron core 20. As a result, end plate 81 consisting of the end plate parts 81a to 81c becomes fastened to the end surface of the outer peripheral outer core 20.

With such a configuration, in the first embodiment, the end plate 81 can be fastened to the outer peripheral iron core 20 even after the extensions 51a to 53b have been bent. In other words, in the first embodiment, the process of bending the extensions 51a to 53b may be performed even after the end plate 81 has been fastened to the outer peripheral iron core 20, or before the end plate 81 is fastened to the outer peripheral iron core 20. Thus, the assembly process of the reactor 6 is not restricted, preventing a reduction in assembly efficiency.

Referring again to FIG. 1, the outer peripheral iron core 20 is composed of a plurality of, for example, three outer peripheral iron core parts 24 to 26 divided at equal intervals in the circumferential direction. The outer peripheral iron core parts 24 to 26 are formed integrally with the iron cores 41 to 43, respectively. In an unillustrated embodiment, the outer peripheral iron core parts 24 to 26 may be in contact with the iron cores 41 to 43, respectively. When the outer peripheral iron core 20 is formed from a plurality of outer peripheral iron core parts 24 to 26, as mentioned above, even if the outer peripheral iron core 20 is large, such a large outer peripheral iron core 20 can be easily manufactured.

Referring to FIG. 4 in detail, the hole 71a of the end plate part 81a is positioned above the hole 92a of the outer peripheral iron core part 25, the hole 71b of the end plate part 81a is positioned above the hole 91a of the outer peripheral iron core part 24, and fastening is performed as described above. Namely, the end plate part 81a is disposed so as to straddle the two mutually adjacent outer peripheral iron core parts 24 and 25, and to fasten these two outer peripheral iron core parts 24 and 25 to each other. The other end plate parts 81b and 81c similarly fasten two mutually adjacent outer peripheral core parts.

Thus, when the outer peripheral iron core 20 is composed of a plurality of outer peripheral iron core parts 24 to 26, the outer peripheral iron core 20 can be firmly fastened. As a result, the shapes of the gaps 101 to 103 formed between the iron cores 41 to 43 can be maintained. Naturally, each of the end plate parts 81a to 81c may be fastened to each of the outer peripheral iron core parts 24 to 26. Further, even when the reactor 6 is driven, it is possible to suppress the occurrence of noise and vibration.

Figure 5A:
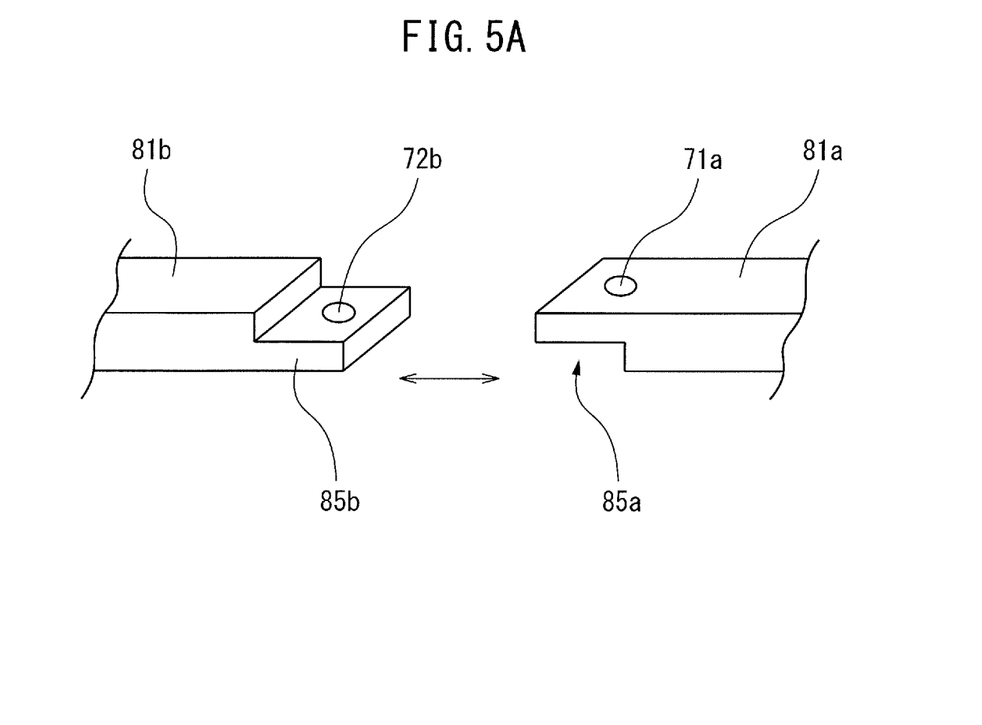
FIG. 5A is an enlarged partial view of an end plate part according to another embodiment.
Figure 5B:
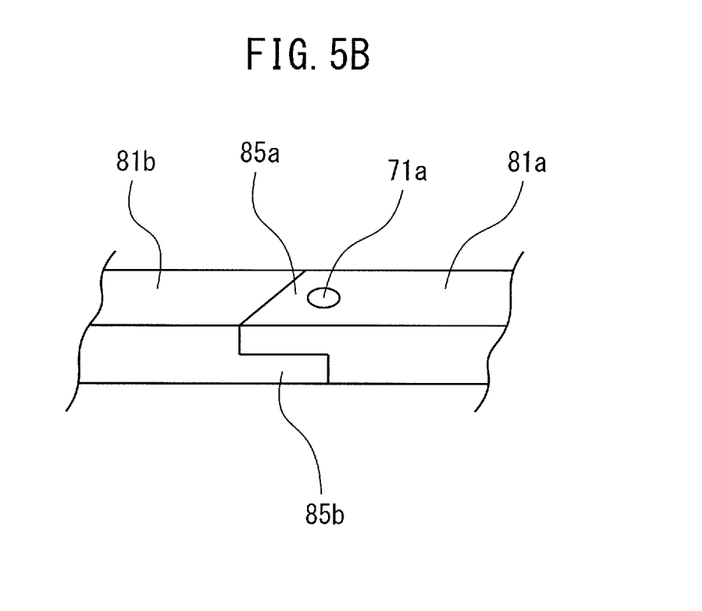
FIG. 5B is another enlarged partial view of an end plate part according to the other embodiment.

FIGS. 5A and 5B are enlarged partial views of the end plate parts according to another embodiment. As shown in these drawings, the edges of the end plate parts 81a and 81b are provided with overlapping sections 85a and 85b, respectively. The overlapping sections 85a and 85b are portions of the end plate parts 81a and 81b having a thickness reduced by about half. The overlapping sections 85a and 85b have the above-mentioned holes 71a, 72b formed therein, respectively.

The overlapping section 85a of the end plate part 81a is formed on the upper side of the end plate part 81a, and the overlapping section 85b of the end plate part 81b is formed on the lower side of the end plate part 81b. These overlapping sections 85a and 85b have complementary shapes. Thus, the end plate parts 81a and 81b partially overlap each other at the overlapping sections 85a and 85b. In an overlapped state, the hole 71a of the overlapping section 85a coincides with the hole 72b of the overlapping section 85b.

The other end sections of the end plate parts 81a and 81b and both end sections of the end plate part 81c have similar configurations. In such a case, it is possible to reduce the number of the above-mentioned fasteners, such as screws, by one-half. Therefore, the number of holes formed in the outer peripheral iron core 20 can similarly be reduced. Note that the end plate parts 81a and 81b on which the overlapping sections 85a and 85b are formed are longer than end plate parts 81a and 81b on which the overlapping sections 85a and 85b are not formed.

Furthermore, the configuration of the core body 5 is not limited to the embodiment shown in FIG. 1. Any core body 5 having another configuration in which the outer peripheral iron core 20 surrounds a plurality of iron core coils is included within the scope of the present disclosure.

Figure 6:
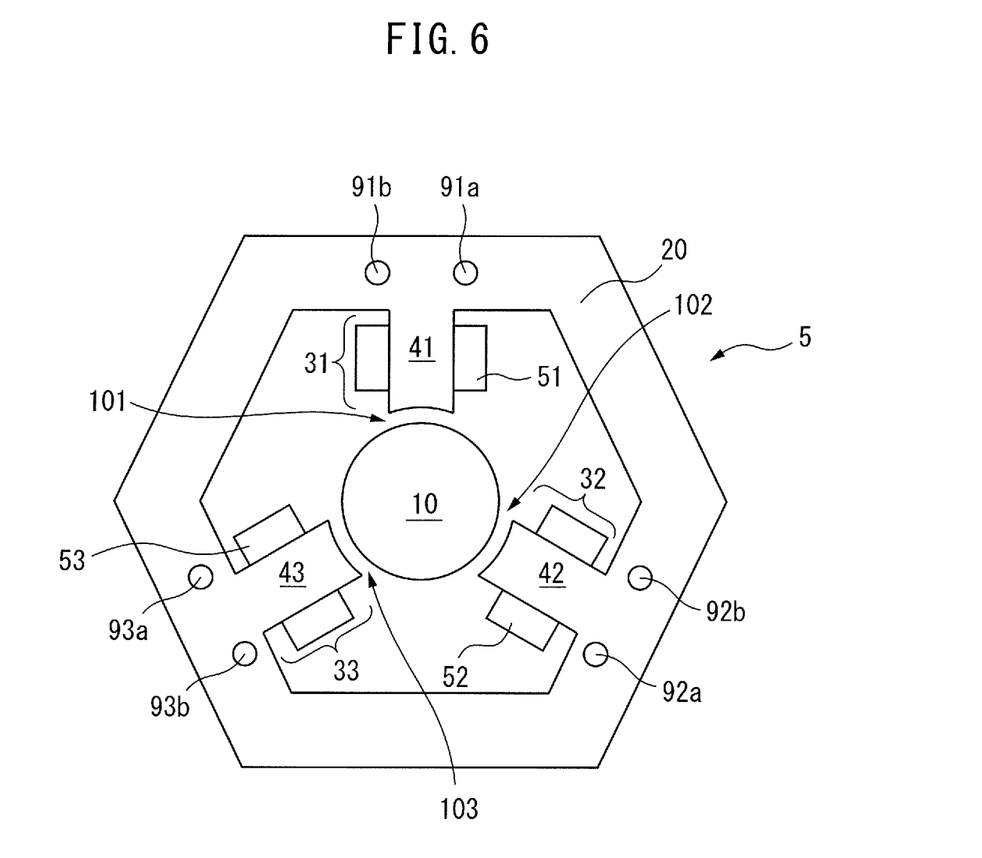
FIG. 6 is a second cross-sectional view of a core body.

For example, a core body 5 as shown in FIG. 6 may be used. The core body 5 shown in FIG. 6 includes a circular central iron core 10, an outer peripheral iron core 20 surrounding the central iron core 10, and three iron core coils 31 to 33. These iron cores 41 to 43 are arranged at equal intervals in the circumferential direction. In FIG. 6, the central iron core 10 is arranged in the center of the annular outer peripheral iron core 20. The inner radial ends of the iron cores 41 to 43 and the central iron core 10 form gaps 101 to 103 therebetween, through which magnetic connection can be established.

Note that the central iron core 10 is produced similarly to the outer peripheral iron core 20 and the iron cores 41 to 43. Furthermore, the outer peripheral iron core 20 may be either a single member, or the outer peripheral iron core 20 may be formed from a plurality of dividable outer peripheral iron core parts. The iron cores 41 to 43 extend to the vicinity of the outer peripheral surface of the central iron core 10. Further, coils 51 to 53 are wound onto the iron cores 41 to 43.

In the core body 5 shown in FIG. 6, the central iron core 10 is disposed in the center of the outer peripheral iron core 20, and the iron cores 41 to 43 are arranged at equal intervals in the circumferential direction. Therefore, in the core body 5 shown in FIG. 6, the coils 51 to 53 of the iron cores 41 to 43 and the gaps are equally spaced from each other in the circumferential direction, giving the core body itself a rotationally symmetrical structure.

Thus, the magnetic fluxes of the core body 5 are typically concentrated at the center thereof, and in three-phase alternating current, the sum of the magnetic fluxes at the center of the core body becomes zero. Therefore, in the configuration shown in FIG. 6, the difference in magnetic path length between the phases is eliminated, and the imbalance of inductance due to the difference in magnetic path length can be eliminated. Furthermore, since the imbalance of the magnetic fluxes generated from the coils can be eliminated, it is possible to eliminate the imbalance of the inductance due to the imbalance of the magnetic fluxes.

Further, in the configuration shown in FIG. 6, etc., by punching a steel plate with high precision using a die, and forming a precisely laminated structure by means of caulking or the like, a central iron core 10, an outer peripheral iron core 20, and iron cores 41 to 31 can be produced with high precision. As a result, the central iron core 10, the outer peripheral iron core 20, and the iron cores 41 to 43 can be assembled with high precision, allowing for dimensional control of the gaps to be performed with high precision.

In other words, in the configuration shown in FIG. 6, etc., in the iron cores 41 to 43 between the central iron core 10 and the outer peripheral iron core 10 can be provided with gaps of any size with high precision at low cost. Therefore, in the configuration shown in FIG. 6, etc., the degree of freedom in the design of the core body 5 is improved, and as a result, inductance accuracy is also improved.

Figure 7:
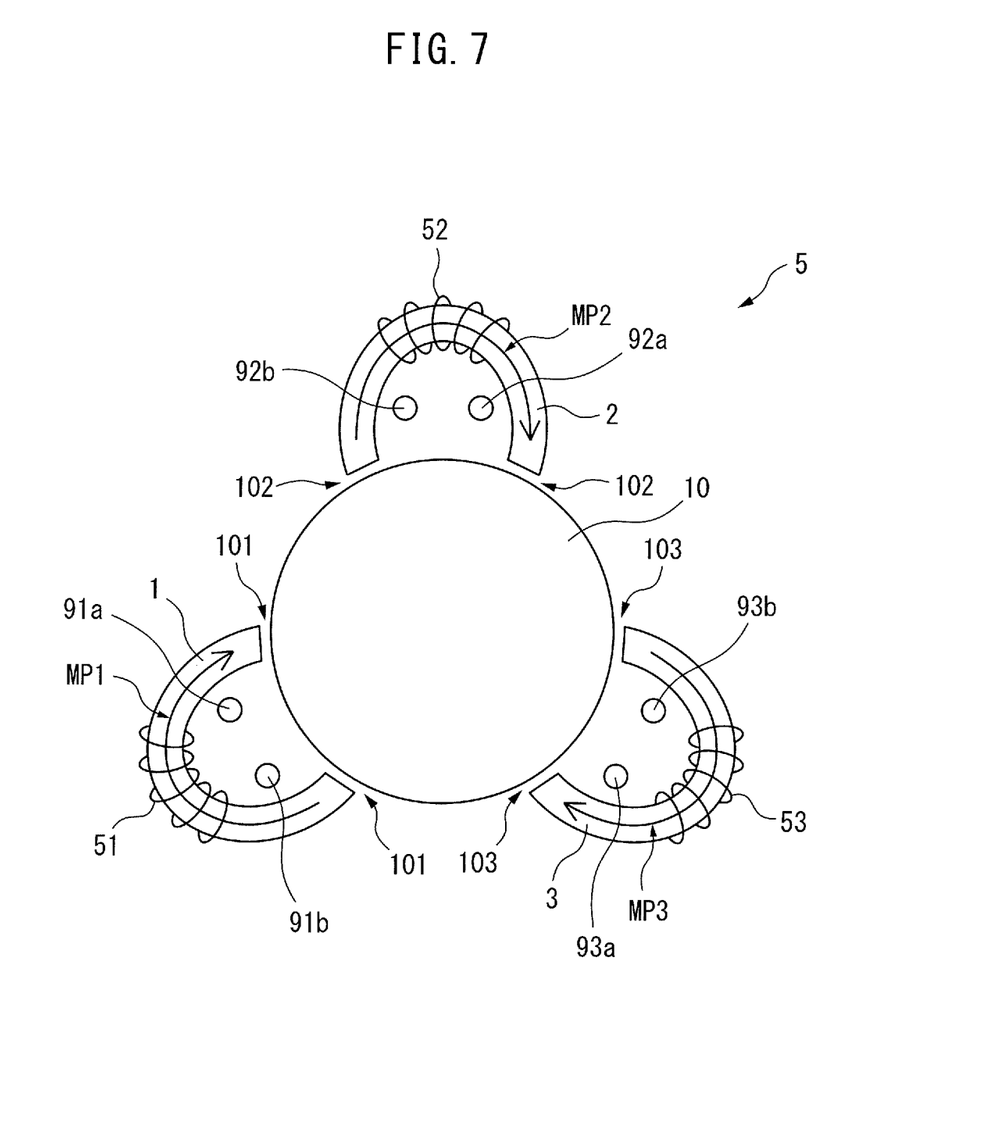
FIG. 7 is a third cross-sectional view of a core body.

Further, a core body 5 having a cross-section as shown in FIG. 7 may be used as the core body 5. In FIG. 7, the core body includes a circular central iron core 10. Further, curved iron cores 1 to 3 having curved shapes are disposed at equal intervals around the central iron core 10. As can be understood from FIG. 7, these curved iron cores 1 to 3 correspond to a portion of a circle or ellipse. Further, coils 51 to 53 are wrapped around the curved iron cores 1 to 3, respectively.

As shown in FIG. 7, the curved iron cores 1 to 3 are arranged such that magnetic paths MP1, MP2, and MP3 loop with respect to the central iron core 10. Furthermore, gaps 101 to 103 are provided between the outer portion of the central iron core 10 and the ends of the curved iron cores 1 to 3, respectively.

Considered in terms of a magnetic circuit, when the gaps 101 to 103 are provided, in general, the magnetic resistance of the gaps 101 to 103 is the dominate factor of the inductance of the reactor, and the inductance value can be determined based on the gaps 101 to 103. Typically, the inductance value is constant up to a large current. However, if the gaps 101 to 103 are made small or are made zero, the magnetic resistance of the iron or electromagnetic steel plate constituting the iron core becomes the dominant factor of the inductance. Accordingly, in general, a low current is the main target. Furthermore, the dimensions can differ greatly.

The shapes of the curved iron cores 1 to 3 are identical, and the distances between two adjacent curved iron cores (1 and 2, 2 and 3, or 3 and 1) are equal. In other words, the three curved iron cores 1 to 3 are arranged around the central iron core 10 in rotational symmetry with respect to the center of the central iron core 10. Note that, as the reactor, from the viewpoint of providing inductance, the curved iron cores 1 to 3 need not have identical shapes, and there are no physical problems even if the curved iron cores 1 to 3 are not arranged in rotational symmetry. Of course, there are no physical problems regarding the sizes of the gaps 101 to 103 even if they are not the same for the curved iron cores 1 to 3.

A reactor 6 in which the above-described end plate 81 is fastened to the outer peripheral iron core 20 of the core body 5 as shown in FIGS. 5A, 5B and 7 is also included within the scope of the present disclosure.

ASPECTS OF THE PRESENT DISCLOSURE

According to the first aspect, there is provided a reactor (6) including a core body (5) and an end plate (81) fastened to at least one end of the core body, wherein the end plate is formed from a plurality of end plate parts (81a to 81c) as shown in FIG. 4.

According to the second aspect, in the first aspect, the core body comprises an outer peripheral iron core (20), at least three iron cores (41 to 43) in contact with or connected to an inner surface of the outer peripheral iron core, and coils (51 to 53) wound onto the at least three iron cores, and wherein gaps (101 to 103), through which magnetic connection can be established, are formed between two adjacent iron cores from among the at least three iron cores or between the at least three iron cores and a central iron core disposed at the center of the core body.

According to the third aspect, in the second aspect, the outer peripheral iron core is composed of a plurality of outer peripheral iron core parts (24 to 26).

According to the fourth aspect, in the third aspect, each of the plurality of end plate parts is fastened to two mutually adjacent outer peripheral iron core parts from among the plurality of outer peripheral iron core parts.

According to the fifth aspect, in any of the first to the fourth aspects, the plurality of end plate parts comprise overlapping sections which partially overlap each other.

According to the sixth aspect, in any of the first to the fifth aspects, the end plate is formed from a non-magnetic material.

Effects of the Aspects

In the first aspect, since the end plate is formed from a plurality of end plate parts, the plurality of end plate parts can be attached to the core body even after the coil extensions have been bent. In other words, it is not necessary that the end plate be attached to the core body before the coil extensions are bent, and the assembly process is not restricted. Therefore, it is possible to prevent a reduction in assembly efficiency.

In the second aspect, since the coil is surrounded by the outer peripheral iron core, magnetic flux leakage can be prevented. Furthermore, if a central iron core is not needed, the core body can be made lightweight.

In the third aspect, since the outer peripheral iron core is divided into multiple parts, even when the outer peripheral iron core is large, the outer peripheral iron core can be easily manufactured.

In the fourth aspect, even if the outer peripheral iron core is divided into a plurality of parts, the outer peripheral iron core and be firmly fastened. As a result, the shapes of the gaps can be maintained.

In the fifth aspect, by providing overlapping sections, the number of fasteners can be reduced.

In the sixth aspect, by forming the end plate from a non-magnetic material, preferable non-magnetic materials including aluminum, SUS, a resin, or the like, it is possible to prevent the magnetic field from passing through the end plate.

Though the present disclosure has been described using exemplary embodiments, a person skilled in the art could understand that the foregoing modifications and various other modifications, omissions, and additions could be made without departing from the scope of the present disclosure.

The invention claimed is:

1. A reactor comprising:
a core body; and
an end plate fastened to at least one end of the core body, wherein the end plate is formed from a plurality of end plate parts;
wherein the core body comprises an outer peripheral iron core composed of a plurality of outer peripheral iron core parts, wherein one of the end plate parts straddle two mutually adjacent outer peripheral iron core parts at the one end of the core body, at least three iron cores in contact with or connected to an inner surface of the outer peripheral iron core, and coils wound onto the at least three iron cores, and wherein air gaps are formed between two adjacent iron cores from among the at least three iron cores at radially inner ends of the iron cores, wherein the inner ends of the iron cores converge towards a center of the outer peripheral iron core and are separated by the air gaps, or between the at least three iron cores at radially inner ends of the iron cores and a central iron core disposed at the center of the core body, through which gaps the iron cores are magnetically connectable,
wherein a contour of the outer peripheral iron core parts forms an apex at a mating side of the outer peripheral iron core parts located between the coils of the two adjacent iron cores, and
wherein the air gaps between the two adjacent iron cores extend radially to a space between the coils of the two adjacent iron cores and the apex.

2. The reactor according to claim 1, wherein each of the plurality of end plate parts is fastened to two mutually adjacent outer peripheral iron core parts from among the plurality of outer peripheral iron core parts.

3. The reactor according to claim 1, wherein the plurality of end plate parts comprise overlapping sections which partially overlap each other.

4. The reactor according to claim 1, wherein the end plate is formed from a non-magnetic material.

* * * * *

UNITED STATES PATENT AND TRADEMARK OFFICE
CERTIFICATE OF CORRECTION

PATENT NO. : 10,702,848 B2
APPLICATION NO. : 15/957327
DATED : July 7, 2020
INVENTOR(S) : Tomokazu Yoshida, Masatomo Shirouzu and Kenichi Tsukada Page 1 of 1

It is certified that error appears in the above-identified patent and that said Letters Patent is hereby corrected as shown below:

On the Title Page

Item (54), delete second occurrence of "INCLUDING END PLATE"

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*